(12) United States Patent
Takahashi et al.

(10) Patent No.: US 7,532,795 B2
(45) Date of Patent: May 12, 2009

(54) RADIATION-CURABLE LIQUID RESIN COMPOSITION

(75) Inventors: Atsuya Takahashi, Tsuchiura (JP); Takeo Shigemoto, Chiba (JP); Zen Komiya, Tsukuba (JP); Hiroki Ohara, Tsukuba (JP)

(73) Assignees: DSM IP Assets B.V., Heerlen (NL); JSR Corporation, Tokyo (JP)

( * ) Notice: Subject to any disclaimer, the term of this patent is extended or adjusted under 35 U.S.C. 154(b) by 205 days.

(21) Appl. No.: 10/568,453

(22) PCT Filed: Aug. 20, 2004

(86) PCT No.: PCT/NL2004/000589

§ 371 (c)(1),
(2), (4) Date: Jan. 18, 2007

(87) PCT Pub. No.: WO2005/019128

PCT Pub. Date: Mar. 3, 2005

(65) Prior Publication Data

US 2007/0191505 A1 Aug. 16, 2007

(30) Foreign Application Priority Data

Aug. 20, 2003 (JP) ............... 2003-296196
Sep. 18, 2003 (JP) ............... 2003-326601

(51) Int. Cl.
*B32B 17/02* (2006.01)
*G02B 6/02* (2006.01)
*G02B 6/04* (2006.01)
*G02B 6/036* (2006.01)
*G02B 6/44* (2006.01)
*C08L 75/16* (2006.01)
*C09D 175/16* (2006.01)
*C08F 290/06* (2006.01)
*C08F 2/46* (2006.01)

(52) U.S. Cl. ............. 385/114; 385/115; 428/378; 526/301; 522/96; 522/173

(58) Field of Classification Search ........... 522/173, 522/96; 385/123, 145, 114, 115; 526/301; 428/378

See application file for complete search history.

(56) References Cited

U.S. PATENT DOCUMENTS

| 4,388,362 | A | * | 6/1983 | Iwata et al. ............... 503/200 |
| 5,605,941 | A | * | 2/1997 | Steinmann et al. ........ 522/170 |
| 6,384,101 | B1 | | 5/2002 | Park et al. |
| 6,449,413 | B1 | | 9/2002 | Duecker |
| 6,767,980 | B2 | * | 7/2004 | Yurugi et al. ............. 526/320 |
| 2002/0115756 | A1 | | 8/2002 | Lin et al. |
| 2003/0139487 | A1 | | 7/2003 | Montgomery et al. |

FOREIGN PATENT DOCUMENTS

EP 0997508 * 5/2000

* cited by examiner

*Primary Examiner*—Susan W Berman
(74) *Attorney, Agent, or Firm*—Nixon & Vanderhye P.C.

(57) ABSTRACT

The invention relates to a radiation-curable liquid resin composition comprising:
(A) 20-90 wt % of a urethane(meth)acrylate oligomer, and
(B) 1-35 wt % of
a monomer shown by the following formula (1),

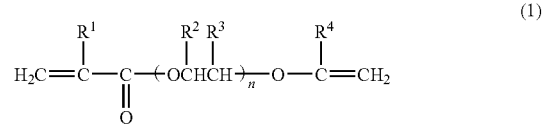

(1)

wherein $R^1$ represents a hydrogen atom or a methyl group, $R^2$ and $R^3$ individually represent a hydrogen atom or an alkyl group having 1-4 carbon atoms, $R^4$ represents a hydrogen atom or a methyl group, and n represents an integer of 1-6, or
a monomer including a hydroxyl group.

16 Claims, No Drawings

RADIATION-CURABLE LIQUID RESIN COMPOSITION

This application is the U.S. national phase of international application PCT/NL2004/000589 filed 20 Aug. 2004 which designated the U.S. and claims benefit of JP2003-296196, dated 20 Aug. 2003 and JP2003-326601, dated 18 Sep. 2003, the entire content of which is hereby incorporated by reference.

FIELD OF THE INVENTION

The present invention relates to a radiation-curable liquid resin composition. The invention further relates to the use of said radiation-curable liquid resin composition, to a coated optical fiber and to an optical fiber ribbon.

DESCRIPTION OF RELATED ART

Radiation-curable liquid resin compositions are widely used in the optical fiber industry for producing optical fibers, ribbons, and cables. Optical glass fibers, for example, are usually covered with at least one layer (two layers, in many cases) of a radiation-curable film immediately after drawing from a matrix material to produce an optical fiber core (hereinafter may be referred to as "core") to maintain characteristics inherently possessed by glass fibers. Immediately after covering each layer, the coatings are rapidly cured usually by ultraviolet radiation. In this technical field, a coating composition that can be cured more rapidly is desired to increase the production speed of optical fibers. A radiation-curable matrix material and a bundling material can support and protect each optical fiber core to be covered when producing optical fiber ribbons, optical fiber cables, and related structural objects by bundling the cores. Moreover, radiation-curable ink can be used for identifying each core of optical fibers by attaching a color cord for every core. All these optical fiber coating materials are preferably radiation-curable. A first coating layer directly in contact with glass fiber, which is called a primary coating layer, is a flexible coating layer to prevent a small bending of the glass fiber. A second coating layer in contact with the outside of the primary coating is called a secondary coating layer. This layer is a tough coating layer providing the glass fiber with a more durable external cover.

The technology of such optical fiber coatings is described in for example U.S. Pat. Nos. 5,336,563; 5,595,820; 5,199,098; 4,923,915; 4,720,529 and 4,474,830. Typical coating materials have been reported in U.S. Pat. Nos. 5,336,563 and 4,992,524 (primary coating materials), Japanese Patent Application Laid-open No. 10-81705 (secondary coating materials), Japanese Patent Application Laid-open No. 11-49534 and U.S. Pat. No. 5,146,531 (other coating materials).

The curing speed of a radiation-curable liquid resin composition used as an optical fiber coating material is greatly affected by the types of monomers used in the composition. Several types of (meth)acrylate monomers are usually used in combination to provide an appropriate balance between the curing speed on the surface of the coating layer and the curing speed inside the coating film. In addition to various (meth) acrylate monomers, N-vinyl monomers such as N-vinyl caprolactam and N-vinylpyrrolidine are conventionally used to increase the curing speed of coating layers.

However, since N-vinyl monomers may cause yellowing of the fiber coating layers, a composition that can satisfy both a high curing speed and a low yellowing property has been desired. A coating material having a low viscosity that can be easily handled and can produce cured products with a Young's modulus in the range of about 50-1,200 MPa has been desired, particularly, as a secondary coating material, a matrix material and a bundling material.

An object of the present invention is to provide a radiation-curable liquid resin composition having a low viscosity, which is easy to handle in spite of its capability of producing a cured product with a Young's modulus of about 50-1,200 MPa, having a high curing speed, exhibiting good dilutability, capable of producing a cured product with only a slight color change (yellowing) and superior surface characteristics, and useful as a primary coating material, a secondary coating material, a matrix material, a bundling material, an ink, and the like in optical fibers.

SUMMARY OF THE INVENTION

It has now surprisingly been found that the above object can be achieved by adding at least one monomer having an ethylenically unsaturated bond and a vinyl ether group in the molecule or at least one monomer including a hydroxyl group to a radiation-curable liquid resin composition containing a specific amount of urethane(meth)acrylate. The present invention has been achieved based on this finding.

DETAILED DESCRIPTION OF THE INVENTION

Specifically, the present invention provides a radiation-curable liquid resin composition comprising:
(A) 20-90 wt % of a urethane(meth)acrylate oligomer, and
(B) 1-35 wt % of
a monomer shown by the following formula (1),

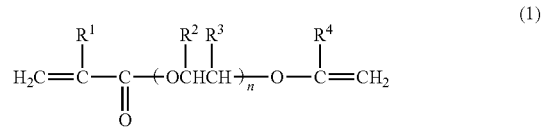

wherein $R^1$ represents a hydrogen atom or a methyl group, $R^2$ and $R^3$ individually represent a hydrogen atom or an alkyl group having 1-4 carbon atoms, $R^4$ represents a hydrogen atom or a methyl group, and n represents an integer of 1-6, or a monomer including a hydroxyl group The radiation-curable liquid resin composition of the present invention has a low viscosity, is easy to handle in spite of its capability of producing a cured product with a Young's modulus of about 50-1,200 MPa, has a high curing speed, can be well diluted, and can produce a cured product with only a slight color change (yellowing) and superior surface characteristics. Therefore, the composition is useful as a primary coating material, a secondary coating material, a matrix material, a bundling material, an ink, and the like in optical fibers, in particular, as a secondary coating material, a matrix material and a bundling material.

There are no specific limitations to the urethane(meth) acrylate of the component (A) in the present invention. For example, the urethane(meth)acrylate (A) can be obtained by reacting (a) a polyol compound, (b) a polyisocyanate compound, and (c) a hydroxy-functional ethylenically unsaturated monomer, resulting in a compound having an end capped with a reaction compound obtained by reacting at least one end of the polyol compound (a), for example, with the polyisocyanate compound (b) and the hydroxy-functional ethylenically unsaturated monomer (c). "End-cap" herein indicates an addition reaction of a functional group to the end of the polyol compound (a). The end-cap structure bonds to the polyol compound (a) via a urethane bond. The urethanization reaction is carried out in the presence of a catalyst. As examples of the urethanization reaction, dibutyl tindilaurate and diazabicyclo octane crystals can be given. It is also possible to obtain the urethane(meth)acrylate (A) by reacting only the polyisocyanate compound (b) and the hydroxy-functional ethylenically unsaturated monomer (c). The urethane (meth)acrylate (A) is The urethane(meth)acrylate (A) can be a single urethane (meth)acrylate or a mixture of two or more urethane(meth) acrylates. The urethane(meth)acrylate (A) preferably has at least two ethylenically unsaturated groups bonded with the oligomer main chain. For example, the ethylenically unsaturated group may be present at each end of the oligomer main chain as a reactive end group. The oligomer main chain may have polyether, polyolefin, polyester, polycarbonate, hydrocarbon, or copolymers of these compounds as a base. The oligomer main chain is preferably a polyol prepolymer such as polyether polyol, polyolefin polyol, polycarbonate polyol, or a mixture of these prepolymers. The molecular weight of the polyol prepolymer is preferably 600-11,000, more preferably 700-10,000, still more preferably 900-5100, most preferably 900-3100 and in particular 1,000-3,000 g/mol.

The oligomer main chain of the urethane(meth)acrylate (A) may be one or more oligomer blocks which are bonded to each other via urethane bonds. For example, one or more types of polyol prepolymers may be bonded by a method known in the art. If the polyol prepolymer is a polyether polyol, a coating with a low glass transition temperature and excellent mechanical characteristics can be obtained. If the oligomer main chain is a polyolefin polyol, a coating with exceptionally improved water resistance can be obtained. A polycarbonate oligomer can be prepared by reacting, for example, a polycarbonate polyol (a), polyisocyanate (b), and hydroxy-functional ethylenically unsaturated monomer (c).

As specific examples of the method for preparing the urethane(meth)acrylate (A), a method of reacting the polyol (a), the polyisocyanate compound (b), and the hydroxy-functional ethylenically unsaturated monomer (c) all together; a method of reacting the polyol (a) and the polyisocyanate compound (b), and reacting the resulting product with the hydroxy-functional ethylenically unsaturated monomer (c); a method of reacting the polyisocyanate compound (b) and the hydroxy-functional ethylenically unsaturated monomer (c), and reacting the resulting product with the polyol (a); a method of reacting the polyisocyanate compound (b) and the hydroxy-functional ethylenically unsaturated monomer (c), reacting the resulting product with the polyol (a), and reacting the resulting product with the hydroxy-functional ethylenically unsaturated monomer (c); and the like can be given.

In the reaction of the hydroxyl group of the polyol (a) with the isocyanate group of the polyisocyanate compound (b), it is preferable to maintain the stoichiometric balance between the hydroxyl functional groups and isocyanate functional groups, while controlling the reaction temperature at 25° C. or more. A substantial amount of the hydroxyl functional groups should be consumed. The molar ratio of the isocyanate and hydroxy-functional ethylenically unsaturated monomer is 3:1 to 1.2:1, and preferably 2:1 to 1.5:1. The hydroxy-functional ethylenically unsaturated monomer bonds with the isocyanate compound via a urethane bond. As examples of the monomer having a (meth)acrylate-functional group, hydroxy-functional acrylates such as 2-hydroxyethyl acrylate and 2-hydroxypropyl acrylate can be given. As examples of monomers having a vinyl ether functional group, 4-hydroxybutyl vinyl ether and triethylene glycol monovinyl ether can be given. As examples of monomers having a maleate functional group, maleic acid and hydroxy-functional maleate can be given.

As the polyol (a) used to synthesize the urethane(meth) acrylate oligomer (A), a polyether polyol, polyalkylene polyol, polyester polyol, polycarbonate polyol, polycaprolactone polyol, and the like may be used. As the polyol, a diol, triol, tetraol, pentaol, hexaol, or the like may be used. Of these, a diol and a triol are preferable. A diol is still more preferable. Of these, a polyether diol is particularly preferable. The polyether diol may be used in combination with other diols. The polyether polyol is generally produced by ring-opening polymerization of an ion-polymerizable cyclic compound. The polyether polyol may be a homopolymer of one type of an ion-polymerizable cyclic compound, or may be a copolymer of two or more types of ion-polymerizable cyclic compounds. There are no specific limitations to the manner of copolymerization, which may be any of random copolymerization, block copolymerization, or graft copolymerization.

As examples of the ion-polymerizable cyclic compounds used to produce the polyether diol, cyclic ethers such as ethylene oxide, propylene oxide, butene-1-oxide, isobutene oxide, oxetane, 3,3-dimethyloxetane, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyloxetane, vinyltetrahydrofuran, vinylcyclohexene oxide, phenyl glycidyl ether, butyl glycidyl ether, and glycidyl benzoate can be given. As the polyether polyol obtained by ring-opening polymerization of one type of an ion-polymerizable cyclic compound, polyether alkylene diols such as polyethylene glycol, polypropylene glycol, polytetramethylene glycol, polybutylene glycol, polyhexamethylene glycol, polyheptamethylene glycol, and polydecamethylene glycol can be given. As the polyether diol obtained by ring-opening copolymerization of two or more types of ion-polymerizable cyclic compounds, poly(propylene-co-ethylene)glycol, poly(tetramethylene-co-ethylene)glycol, poly(tetramethylene-co-propylene)glycol, poly(tetramethylene-co-(methyltetramethylene))glycol, poly(butylene-co-ethylene)glycol, poly(butylene-co-propylene)glycol, and the like can be given.

Polyether diols obtained by the ring-opening copolymerization of these ion-polymerizable cyclic compounds with cyclic imines such as ethyleneimine, cyclic lactonic acids such as γ-propyolactone or glycolic acid lactide, or dimethylcyclopolysiloxanes may be used. As specific examples of combinations of two or more ion-polymerizable cyclic compounds, combinations of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, butene-1-oxide and ethylene oxide, a ternary copolymer of tetrahydrofuran, butene-1-oxide, and ethylene oxide, and the like can be given. The ring-opening copolymer of these ion-polymerizable cyclic compounds may be either a random copolymer or a block copolymer.

Of these polyether diols, polypropylene glycol, polybutylene glycol, and poly(butylene-co-propylene)glycol are preferable, and polypropylene glycol is particularly preferable from the viewpoint of providing jelly resistance and water resistance to the cured product of the present invention. The polystyrene-reduced number average molecular weight of the polyether diol determined by a gel permeation chromatography (GPC) method is particularly preferably 900 to 3,100, more preferably 1000-3000 g/mol.

When a polyether olefin diol is used, the polyether olefin is preferably a linear or branched hydrocarbon with two or more hydroxyl terminal groups. This hydrocarbon is preferably a non-aromatic compound consisting of methylene groups (—CH$_2$—) as a major portion of the main chain which contains unsaturated bonds and unsaturated groups suspending from the main chain as side chains. Since the long-term stability of cured optical-fiber coating increases as the degree of unsaturation decreased, a completely saturated compound, for example, a hydrogenated hydrocarbon is preferable. As examples of the hydrocarbon diol, polymers having hydroxyl groups at the ends and completely or partially hydrogenated polymers such as 1,2-polybutadiene, 1,4- or 1,2-polybutadiene copolymer, 1,2-polybutadiene-ethylene or -propylene copolymer, polyisobutylene polyol, mixtures of these polymers can be given. As the hydrocarbon diol, almost completely hydrogenated 1,2-polybutadiene or 1,2-polybutadiene/ethylene copolymer are preferable.

When the polyether diol obtained by ring-opening copolymerization of a polyether olefin diol or two or more types of ion-polymerizable cyclic compounds, such a polyether diol preferably has two or more hydroxyl groups in average. This oligomer main chain polyol may have more than two hydroxyl groups in average. As examples of the oligomer diol, a polyether diol, polyolefin diol, polyester diol, polycarbonate diol, and mixtures of these diols can be given. A polyether diol, polyolefin diol, or a combination of these diols are preferable. When a polyether diol is used, it is desirable that the polyether is substantially amorphous. Such a polyether preferably contains one or more recurring units selected from the following monomer groups:

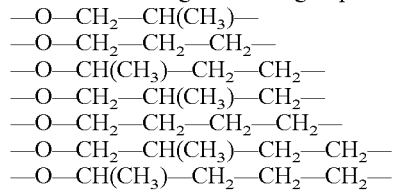

As an example of the polyether polyol which can be used, a reaction product of 20 wt % of 3-methyltetrahydrofuran and 80 wt % of tetrahydrofuran can be given. This polyether copolymer has both branched oxyalkylene recurring units and unbranched oxyalkylene recurring units, which is commercially available as PTGL1000 (manufactured by Hodogaya Chemical Co., Ltd.). Another examples of the polyether which can be used in these series is PTGL2000 (manufactured by Hodogaya Chemical Co., Ltd.).

As examples of commercially available products of these polyether diols, PTMG650, PTMG1000, PTMG2000 (manufactured by Mitsubishi Chemical Corp.), EXCENOL 1020, 2020, 3020, PREMINOL PML-4002, PML-5005 (manufactured by Asahi Glass Co., Ltd.), UNISAFE DC1100, DC1800, DCB1000 (manufactured by Nippon Oil and Fats Co., Ltd.), PPTG1000, PPTG2000, PPTG4000, PTG400, PTG650, PTG1000, PTG2000, PTG-L1000, PTG-L2000 (manufactured by Hodogaya Chemical Co., Ltd.), Z-3001-4, Z-3001-5, PBG2000 (manufactured by Daiichi Kogyo Seiyaku Co., Ltd.), ACCLAIM 2200, 2220, 3201, 3205, 4200, 4220, 8200, 12000 (manufactured by Lyondell), and the like can be given.

The examples of the polycarbonate diol include a compound produced by alcoholysis of a diethylene carbonate with a diol. This diol may be an alkylene diol having 2-12 carbon atoms such as 1,4-butanediol, 1,6-hexanediol, or 1,12-dodecane diol. A mixture of these diols can also be used. In addition to carbonate groups, the polycarbonate diol may include ether bonds in the main chain. Therefore, a polycarbonate copolymer of an alkylene oxide monomer and the above-mentioned alkylene diol, for example, can be used. As examples of the alkylene oxide monomer, ethylene oxide and tetrahydrofuran can be given. Compared with a polycarbonate homopolymer, these copolymers can produce a cured coating having low modulus and capable of preventing crystallization of the liquid coating composition. A mixture of a polycarbonate diol and a polycarbonate copolymer can also be used.

As specific examples of the polycarbonate diol, Duracarb 122 (manufactured by PPG Industries) and Permanol KM10-1733 (manufactured by Permuthane, Massachusetts of the U.S.) can be given. Duracarb 122 is manufactured by alcoholysis of diethyl carbonate with hexanediol. As an example of the polyester diol, the reaction product of a saturated polycarboxylic acid or its anhydride and a diol can be given. Examples of the saturated polycarboxylic acid or its anhydride include phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, glutaric acid, malonic acid, pimelic acid, suberic acid, 2,2-dimethylsuccinic acid, 3,3-dimethylglutaric acid, 2,2-dimethylglutaric acid, anhydrides of these acids, and mixtures of these acids. As examples of the diol, 1,4-butanediol, 1,8-octane diol, diethylene glycol, 1,6-hexanediol, and dimethylol cyclohexane can be given. Polycaprolactones are included in this classification and commercially available from Union Carbide Corp. as Tone Polyol series products such as Tone 0200, 0221, 0301, 0310, 2201, and 2221, for example. Tone 0301 and Tone 0310 are three-functional compounds.

As examples of polyisocyanate (b) used for synthesizing the urethane(meth)acrylate (A), aromatic diisocyanates, alicyclic diisocyanates, aliphatic diisocyanates, and the like can be given. There are no specific limitations to the polyisocyanate (b) insofar as the compound can be used in the resin composition for optical fibers. Of these, aromatic diisocyanates and alicyclic diisocyanates are preferable, with 2,4-tolylene diisocyanate and isophorone diisocyanate being still more preferable. These diisocyanate compounds may be used either individually or in combination of two or more.

Any polyisocyanates can be used either independently or as a mixture as the polyisocyanate (b).

Diisocyanate is preferable as the polyisocyanate (b) used for synthesizing the urethane(meth)acrylate (A). Examples of the polyisocyanate (b) include isophorone diisocyanate, tetramethyl xylene diisocyanate, toluene diisocyanate, diphenyl methylene diisocyanate, hexamethylene diisocyanate, cyclohexylene diisocyanate, methylene dicyclohexane diisocyanate, 2,2,4-trimethylhexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, and a compound with a diisocyanate such as toluene diisocyanate bonded to both terminals of a polyalkylene oxide or polyester glycol. Of these diisocyanates, isophorone diisocyanate and toluene diisocyanate are preferable.

As the hydroxy-functional ethylenically unsaturated monomer (c) used for synthesizing the urethane(meth)acrylate (A), a hydroxyl group-containing (meth)acrylate, hydroxyl group-containing vinyl ether, hydroxyl group-containing maleate, and hydroxyl group-containing fumarate can be given. A hydroxyl group-containing (meth)acrylate in which the hydroxyl group is bonded to the primary carbon atom (hereinafter called "primary hydroxyl group-containing (meth)acrylate") and a hydroxyl group-containing (meth) acrylate in which the hydroxyl group is bonded to the secondary carbon atom (hereinafter called "secondary hydroxyl group-containing (meth)acrylate") are preferable in view of reactivity with an isocyanate group of the polyisocyanate.

As examples of the primary hydroxyl group-containing (meth)acrylate, 2-hydroxyethyl(meth)acrylate, 4-hydroxybutyl(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth) acrylate, and the like can be given.

As examples of the (meth)acrylate containing a secondary hydroxyl group, 2-hydroxypropyl(meth)acrylate, 2-hydroxybutyl(meth)acrylate, 2-hydroxy-3-phenyloxypropyl(meth) acrylate, 4-hydroxycyclohexyl(meth)acrylate, a compound obtained by the addition reaction of (meth)acrylic acid and a compound containing a glycidyl group such as alkyl glycidyl ether, allyl glycidyl ether, or glycidyl(meth)acrylate, and the like can be given. These hydroxy-functional ethylenically unsaturated monomers may be used either individually or in combination of two or more.

The proportion of the polyol (a), polyisocyanate compound (b), and hydroxy-functional ethylenically unsaturated monomer (c) used for synthesizing the urethane(meth)acrylate (A) is preferably determined so that an isocyanate group included in the polyisocyanate compound and a hydroxyl group included in the hydroxy-functional ethylenically unsaturated monomer are respectively 1.1-2 equivalents and 0.1-1 equivalent for one equivalent of a hydroxyl group included in the polyol.

In addition, diamines may be used for synthesizing the urethane(meth)acrylate (A) in combination with a polyol. As examples of diamines, diamines such as ethylenediamine, tetramethylenediamine, hexamethylenediamine, p-phenylenediamine, and 4,4'-diaminodiphenylmethane, diamines containing a hetero atom, polyether diamines, and the like can be given.

Compounds having a functional group which can be added to an isocyanate group may be used instead of part of the hydroxy-functional ethylenically unsaturated monomer. As examples of such a compound, γ-aminopropyltriethoxysilane, γ-mercaptopropyltrimethoxysilane, and the like can be given. Use of these compounds further improves adhesion to substrates such as glass.

In the synthesis of the urethane(meth)acrylate (A), it is preferable to use a urethanization catalyst such as copper naphthenate, cobalt naphthenate, zinc naphthenate, dibutyltin dilaurate, dibutyltin diacetate, dioctyltin dilaurate, dioctyltin diacetate, zirconium acetylacetonate, triethylamine, 1,4-diazabicyclo[2.2.2]octane, or 2,6,7-trimethyl-1,4-diazabicyclo[2.2.2]octane in an amount of 0.01-1 wt % of the total amount of the reactants. The reaction temperature is usually 5-90° C., and preferably 10-80° C.

The urethane(meth)acrylate (A) may be obtained without the polyol compound (a), i.e. by reacting only the polyisocyanate compound (b) and the hydroxy-functional ethylenically unsaturated monomer (c). In one embodiment of the invention the urethane(meth)acrylate oligomer (A) includes at least one urethane(meth)acrylate which is obtained without the polyol compound (a), in addition to the urethane(meth)acrylate oligomer obtained by reacting the polyol compound (a), polyisocyanate (b), and hydroxyl group-containing (meth) acrylate (c). Such combination may be preferable from the viewpoint of reducing the Young's modulus and surface adhesion of the resulting cured product. The amount of the of urethane(meth)acrylate which is obtained without the polyol compound (a) is preferably 10 to 80 wt %, and more preferably 25 to 55 wt %, still more preferably 10-50 wt % and most preferably 30-50 wt % of the total amount of the component (A).

As specific examples of the polymer formed only from a polyisocyanate compound (b) and a hydroxy-functional ethylenically unsaturated monomer (c), a urethane(meth)acrylate obtained by reacting 2-hydroxyethyl (meth)acrylate and 2,4-tolylene diisocyanate can be given. The molar ratio at which 2-hydroxyethyl (meth)acrylate and 2,4-tolylene diisocyanate are reacted is preferably about 2:1.

The content of the urethane(meth)acrylate (A) in the radiation-curable liquid resin composition of the present invention is 20 to 90 wt %, preferably 40-90 wt %, more preferably 65-90 wt %, and particularly preferably 70-90 wt % in order to ensure excellent mechanical characteristics such as Young's modulus and breaking elongation of the cured product and appropriate viscosity of the radiation-curable liquid resin composition of the present invention. If the content exceeds 90 wt %, since the cured product exhibits a Young's modulus of more than 1200 MPa, the composition is unsuitable for a resin for coating optical fibers. Moreover, viscosity of the radiation-curable resin composition exceeds 10 Pa·s, thereby resulting in decreased workability. Moreover, water resistance of the cured product deteriorates. If less than 20 wt %, it is difficult to obtain a cured products having Young's modulus of elasticity suitable as an optical-fiber secondary layer and a tape layer. The Young's modulus of the cured product used as a secondary layer or a tape layer for optical fibers is preferably 50-1200 MPa. The viscosity of the radiation-curable liquid resin composition is preferably 1.0-6.0 Pa·s, more preferably 1.0-5.0 Pa·s. If (B) is a (meth)acrylate monomer including a hydroxyl group is particularly preferred that the content of the urethane(meth)acrylate (A) in the radiation-curable liquid resin composition of the present invention is 65 to 90 wt %, more preferably 40 to 90 wt %.

The component (B) used in the present invention is a monomer shown by the above formula (1) or a (meth)acrylate monomer including a hydroxyl group. As examples of an alkyl group represented by $R^2$ and $R^3$ in the above formula (1), a methyl group, ethyl group, and n-propyl group can be given. n is preferably 1-4, and particularly preferably 1-3. Specific examples are 2-(2'-vinyloxyethoxy)ethyl (meth) acrylate and 2-vinyloxyethyl(meth)acrylate. As commercially available products of the component (B), VEEA, VEEM, VEA (manufactured by NIPPON SHOKUBAI Co., Ltd.) and the like can be mentioned.

The (meth)acrylate monomer including a hydroxyl group preferably includes an aliphatic or alicyclic substituent which includes a hydroxyl group. Specific examples are the compounds given as examples of the component (c) used to synthesize the urethane(meth)acrylate oligomer (A) can be given. The component (c) is used as the reactive component for producing the urethane(meth)acrylate oligomer (A). However, the component (B) of the present invention is not added as a raw material for the component (A), but is added as a reactive diluent. As the component (B), the hydroxy-functional aliphatic (meth)acrylate and the hydroxy-functional alicyclic (meth)acrylate given as examples of the component (c) are preferred examples. Of these, hydroxy $C_2$-$C_8$ alkyl (meth)acrylates and hydroxy $C_2$-$C_8$ cycloalkyl(meth)acrylates such as 2-hydroxyethyl(meth)acrylate, 2- hydroxypropyl(meth)acrylate, 4-hydroxybutyl(meth)acrylate, and 4-hydroxycyclohexyl(meth)acrylate are particularly preferable.

A high curing speed can be obtained and yellowing of the cured product can be prevented without adding a nitrogen-containing vinyl monomer by adding a specific amount of the component (B).

The component (B) may be used either individually or in combination of two or more. If (B) is a monomer shown in the above formula (1), the proportion of the component (B) used in the radiation-curable liquid resin composition of the present invention is usually 1-35 wt %, preferably 5-35 wt %, and more preferably 10-30 wt %. If (B) is a (meth)acrylate monomer including a hydroxyl group, the amount of (B) used in the radiation-curable liquid resin composition of the present invention is usually 1 to 35 wt %, preferably 1 to 30 wt %, still more preferably 2-20 wt % and most preferably 5-15 wt %. The above ranges are preferable in view of the viscosity, xanthochroism, cure speed of the liquid resin composition.

The composition of the present invention may optionally contain a reactive diluent (C), (C) not being covered by the definition of component (B). The reactive diluent (C) is a vinyl monomer copolymerizable with the component (A), excluding the component (B) compounds. The reactive diluent can be used to adjust the viscosity of the coating composition. Therefore, the reactive diluent is a low viscosity monomer having at least one functional group which is polymerizable when exposed to chemical rays.

As examples of the component (C), (C1) a polymerizable monofunctional compound or (C2) a polymerizable polyfunctional compound can be given. As examples of the polymerizable mono-functional compound (C1), vinyl group-containing lactams such as N-vinylpyrrolidone and N-vinylcaprolactam; (meth)acrylates having an alicyclic structure such as isobornyl(meth)acrylate, bornyl(meth)acrylate, tricyclodecanyl(meth)acrylate, dicyclopentanyl(meth)acrylate, 4-butylcyclohexyl(meth)acrylate; (meth)acrylates having an aromatic structure such as benzyl(meth)acrylate; acryloylmorpholine, vinyl imidazole, vinylpyridine, 2-hydroxyethyl(meth)acrylate, 2-hydroxypropyl(meth)acrylate, 2-hydroxybutyl(meth)acrylate, methyl(meth)acrylate, ethyl(meth)acrylate, propyl(meth)acrylate, isopropyl(meth)acrylate, butyl(meth)acrylate, amyl(meth)acrylate, isobutyl(meth)acrylate, t-butyl(meth)acrylate, pentyl(meth)acrylate, isoamyl(meth)acrylate, hexyl(meth)acrylate, heptyl(meth)acrylate, octyl(meth)acrylate, isooctyl(meth)acrylate, 2-ethylhexyl(meth)acrylate, nonyl(meth)acrylate, decyl(meth)acrylate, isodecyl(meth)acrylate, undecyl(meth)acrylate, dodecyl(meth)acrylate, lauryl(meth)acrylate, stearyl(meth)acrylate, isostearyl(meth)acrylate, tetrahydrofurfuryl(meth)acrylate, butoxyethyl(meth)acrylate, ethoxydiethylene glycol(meth)acrylate, phenoxyethyl(meth)acrylate, polyethylene glycol mono(meth)acrylate, polypropylene glycol mono(meth)acrylate, methoxyethylene glycol(meth)acrylate, ethoxyethyl(meth)acrylate, methoxypolyethylene glycol(meth)acrylate, methoxypolypropylene glycol(meth)acrylate, diacetone(meth)acrylamide, isobutoxymethyl(meth)acrylamide, N,N-dimethyl(meth)acrylamide, t-octyl(meth)acrylamide, dimethylaminoethyl(meth)acrylate, diethylaminoethyl(meth)acrylate, 7-amino-3,7-dimethyloctyl(meth)acrylate, N,N-diethyl(meth)acrylamide, N,N-dimethylaminopropyl(meth)acrylamide, hydroxybutyl vinyl ether, lauryl vinyl ether, cetyl vinyl ether, and 2-ethylhexyl vinyl ether can be given.

Of these polymerizable monofunctional compounds (C1), monofunctional (meth)acrylates containing an aliphatic hydrocarbon group having 10 or more carbon atoms are preferable from the viewpoint of dilution properties. The aliphatic group having 10 or more carbon atoms may be linear, branched, or alicyclic. The number of carbon atoms is preferably 10-24. Of these monofunctional monomers, isobornyl(meth)acrylate, isodecyl(meth)acrylate, and lauryl(meth)acrylate are particularly preferable. As examples of commercially available products of these polymerizable monofunctional compounds (C1), IBXA (manufactured by Osaka Organic Chemical Industry Co., Ltd.), Aronix M-110, M-111, M-113, M-114, M-117, and TO-1210 (manufactured by Toagosei Co., Ltd.) can be given.

From the viewpoint of curability, monomers having an acrylate-functional or vinyl-ether functional moiety and an alkyl group or a polyether moiety having 4-20 carbon atoms are preferable as the polymerizable mono-functional compound (C1). Examples of such reactive diluents include hexyl acrylate, 2-ethylhexyl acrylate, isobornyl acrylate, decyl acrylate, lauryl acrylate, stearyl acrylate, ethoxyethoxyethyl acrylate, lauryl vinyl ether, 2-ethylhexyl vinyl ether, N-vinylformamide, isodecyl acrylate, iso-octyl acrylate, vinylcaprolactam, and N-vinylpyrrolidone.

Furthermore, a preferable reactive diluent from the viewpoint of modulus of elasticity is a compound containing an aromatic group. As examples of the reactive diluent having an aromatic group, ethylene glycol phenyl ether acrylate, polyethylene glycol phenyl ether acrylate, polypropylene glycol phenyl ether acrylate, and alkyl-substituted phenyl derivatives of these monomers, such as polyethylene glycol nonyl phenyl ether acrylate, can be given.

On the other hand, vinyl group-containing lactams such as N-vinylpyrrolidone and N-vinylcaprolactam can contribute to an increase in the curing speed, but have a drawback of xanthochroism, i.e. properties of causing yellow discoloration of the cured product. Therefore, it is preferable that the radiation-curable composition of the present invention does not contain or contains such lactams in an amount less than 10 wt %, preferably less than 5 wt %, if any.

As examples of the polymerizable polyfunctional compound (C2), trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl(meth)acrylate, tris(2-hydroxyethyl)isocyanurate tri(meth)acrylate, tris(2-hydroxyethyl)isocyanurate di(meth)acrylate, tricyclodecanedimethanol di(meth)acrylate, di(meth)acrylate of diol of ethylene oxide or propylene oxide adduct of bisphenol A, di(meth)acrylate of diol of ethylene oxide or propylene oxide adduct of hydrogenated bisphenol A, epoxy(meth)acrylate obtained by the addition of (meth)acrylate to diglycidyl ether of bisphenol A, triethylene glycol divinyl ether, and the like can be given.

Examples of commercially available products of the above polyfunctional compounds include Light Acrylate 9EG-A and Light Acrylate 4EG-A (manufactured by Kyoeisha Chemical Co., Ltd.), Yupimer UV SA1002, SA2007 (manufactured by Mitsubishi Chemical Corp.), Viscoat 700 (manufactured by Osaka Organic Chemical Industry, Ltd.), KAYARAD R-604, DPCA-20, DPCA-30, DPCA-60, DPCA-120, HX-620, D-310, D-330 (manufactured by Nippon Kayaku Co., Ltd.), ARONIX M-210, M-215, M-315, M-325 (manufactured by Toagosei Co., Ltd.), and the like.

As the polymerizable polyfunctional compound (C2), hydrocarbon diol diacrylates having 2-18 carbon atoms, hydrocarbon divinyl ethers having 4-18 carbon atoms, hydrocarbon triol triacylates having 3-18 carbon atoms, and analogues of these polyethers such as 1,6-hexanediol diacrylate, trimethylolpropane triacylate, hexanediol divinyl ether, triethylene glycol diacrylate, pentaerythritol triacylate, and tripropylene glycol diacrylate are preferable. Particularly preferable polymerizable polyfunctional compounds (C2) are alkoxylated alkyl phenol(meth)acrylates, and most preferable reactive diluent is ethoxylated nonylphenol(meth) acrylate. It is preferable for the oligomers and reactive diluents to contain an acrylate group as a radiation-curable group.

The polymerizable monofunctional compound (C1) and the polymerizable polyfunctional compound (C2) may be used either individually or in combination.

When (B) is a monomer according to formula (1), the component (C) is added to the radiation-curable liquid resin composition of the present invention in an amount of preferably 1-33 wt %, and more preferably 2-30 wt %. If the amount is less than 1 wt %, curability may be impaired. If the amount exceeds 33 wt %, application may become uneven due to low viscosity, thereby resulting in unstable application. When (B) is a (meth)acrylate monomer including a hydroxyl group, the component (C) is added to the radiation-curable liquid resin composition of the present invention in an amount of preferably 5 to 75 wt %, and still more preferably 10 to 70 wt % of the total amount of the composition. If the amount is less than 5 wt %, the curing speed of the composition may be decreased. If the amount exceeds 75 wt %, the application form may change due to low viscosity, thereby resulting in unstable application.

The radiation-curable liquid resin composition of the present invention is cured by applying radiation. Radiation used herein refers to infrared radiation, visible rays, ultraviolet rays, X-rays, $\alpha$-rays, $\beta$-rays, $\gamma$-rays, electron beams, and the like. Of these, ultraviolet rays and electron beams are particularly preferable.

A common light source such as a UV lamp available from Fusion System Corp., for example, can be used as the source of ultraviolet radiation. Other suitable light sources are a low pressure, medium pressure, or high pressure mercury lamp, a super chemical ray fluorescence tube, and a pulse light.

When cured using UV light, a polymerization initiator (D) may optionally be added to the radiation-curable liquid resin composition of the present invention. As the component (D), a photoinitiator (D1) is usually used. If necessary, a heat polymerization initiator (D2) may be used in combination with the photoinitiator (D1).

As the photoinitiator (D1), benzophenone; acetophenone derivatives such as $\alpha$-hydroxyalkyl phenyl ketone, benzoin alkyl ether, or benzyl ketal; acyl phosphine oxides; other bisacyl phosphine oxides; and titanocenes can be given.

As specific examples of the photopolymerization initiator (D1), 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methyl-propan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyidiphenylphosphine oxide, bis-(2,6-dimethoxybenzoyl)-2,4,4-trimethylpentylphosphine oxide, and the like can be given. As examples of commercially available products of the photopolymerization initiator, Irgacure 184, 369, 651, 500, 907, 819, CGI1700, CGI1750, CGI1850, CGI1870, CG2461, Darocur 1116, 1173 (manufactured by Ciba Specialty Chemicals Co., Ltd.), Lucirin TPO (manufactured by BASF), Ubecryl P36 (manufactured by UCB), and the like can be given.

As examples of heat polymerization initiators (D2), peroxides, azo compounds, and the like can be given. Specific examples include benzoyl peroxide, t-butyl oxybenzoate, azobisisobutyronitrile, and the like.

The polymerization initiator (D) is used in the radiation-curable liquid resin composition of the present invention in an amount of preferably 0.1-10 wt %, and particularly preferably 0.5-5 wt %.

Moreover, a photosensitizer, light stabilizer, and the like may be added to the radiation-curable liquid resin composition of the present invention. As examples of the photosensitizer, secondary and/or tertiary amines such as ethanolamine, methyl diethanolamine, dimethyl ethanolamine, triethylamine, triethanolamine, p-ethyldimethylaminobenzoate, p-methyldimethylaminobenzoate, p-ethyldimethylaminobenzoate, p-isoamyldimethylaminobenzoate, benzyldimethylamine, dimethylaminoethyl acrylate, N-phenylglycine, N-methyl-N-phenylglycine can be given. An aliphatic or aromatic halide such as 2-chloromethylnaphthalene and 1-chloro-2-chloromethylnaphthalene, and a compound which forms a free radical, for example, a peroxide and an azo compound, can also be used for accelerating curing. As examples of commercially available products of the photosensitizer, Ubecryl P102, 103, 104, 105 (manufactured by UCB), and the like can be given.

As the light stabilizer, a small amount of UV absorber, typically, a benzotriazole UV absorber, benzophenone UV absorber, or oxanilide UV absorber may be added. A hindered amine light stabilizer (HALS) with a steric hindrance can also be added. As specific examples of light stabilizers, Tinuvin 292, 144, 622LD (manufactured by Ciba Specialty Chemicals Co., Ltd.), Sanol LS770 (manufactured by Sankyo Co., Ltd.), TM-061 (manufactured by Sumitomo Chemical Industries Co., Ltd.), and the like can be given. As examples of silane coupling agents, $\gamma$-aminopropyltriethoxysilane, $\gamma$-mercaptopropyltrimethoxysilane, $\gamma$-methacryloxypropyltrimethoxysilane, commercially available products such as SH6062, SZ6030 (manufactured by Toray-Dow Corning Silicone Co., Ltd.), KBE903, 603, 403 (manufactured by Shin-Etsu Chemical Co., Ltd.), and the like can be given.

As an example of other additives, a thermal inhibitor to inhibit early polymerization during preparation of the composition by mixing various components is particularly noted. Hydroquinone, hydroquinone derivatives, p-methoxyphenol, $\beta$-naphthol, and phenol with steric hindrance, for example, 1,6-di(t-butyl)-p-cresol can be given as examples.

A parting agent to make it easy to remove a coating layer may be added when the composition is used for coating optical-fiber ribbons. Silicones, fluorocarbon oils, and resins are suitable as the parting agent. When used, a suitable parting agent is added to the composition preferably in an amount of 0.5-20 wt %.

Additives such as coloring agents, silane coupling agents, leveling agents, surfactants, preservatives, plasticizers, lubricants, solvents, fillers, aging preventives, wettability improvers, and coating surface improvers may be added to the radiation-curable liquid resin composition in addition to the above components.

The viscosity of the radiation-curable liquid resin composition of the present invention is preferably 0.3-6.0 Pa·s at 25° C., more preferably 1.0-6.0 Pa·s at 25° C., and particularly preferably 1.0-5.0 Pa·s at 25° C. The curing speed is preferably 0.6-0.9, and particularly preferably 0.7-0.9.

The Young's modulus of the cured product obtained from the resin composition of the present invention is preferably 50-1200 MPa, and particularly preferably 500-1200 MPa.

The yellowing index ($\Delta Y.I.$) is preferably 2.0 or less, more preferably 1.5 or less and most preferably 1.3 or less.

The stickiness is preferably 8 N/m or less.

The dynamic friction coefficient is preferably 0.4 or less.

The present invention is described below in more detail by examples. However, the present invention is not limited to these examples. In examples, part(s) refers to part(s) by weight unless otherwise indicated.

EXAMPLES AND COMPARATIVE EXPERIMENTS

Synthesis Example 1

Urethane Acrylate Oligomer UA-1

A reaction vessel equipped with a stirrer was charged with 134.8 g of 2,4-toluene diisocyanate, 774.2 g of polypropylene oxide with a molecular weight of 2000, 0.24 g of 2,6-di-t-butyl-p-cresol, and 0.08 g of phenothiazine. After adding 0.8 g of dibutyltin dilaurate, the mixture was stirred for one hour while controlling the temperature at 25-35° C. Then, 89.9 g of hydroxyethyl acrylate was added and the mixture was stirred for a further one hour at 50-60° C. The reaction was terminated when the residual isocyanate content was 0.1 wt % or less. The resulting urethane acrylate is referred to as "UA-1".

Synthesis Example 2

Urethane Acrylate Oligomer UA-2

A reaction vessel equipped with a stirrer was charged with 413.8 g of 2,4-toluene diisocyanate, 0.24 g of 2,6-di-t-butyl-p-cresol, 0.08 g of phenothiazine, and 0.8 g of dibutyltin dilaurate. After adding 309.2 g of hydroxypropyl acrylate, the mixture was stirred for one hour while controlling the temperature at 25-35° C. Then, 275.9 g of hydroxyethyl acrylate was added and the mixture was stirred for a further one hour at 50-60° C. The reaction was terminated when the residual isocyanate content was 0.1 wt % or less. The resulting urethane acrylate is referred to as "UA-2".

Synthesis Example 3

Urethane Acrylate Oligomer UA-3

A reaction vessel equipped with a stirrer was charged with 428.1 g of 2,4-toluene diisocyanate, 0.24 g of 2,6-di-t-butyl-p-cresol, 0.08 g of phenothiazine, and 0.8 g of dibutyltin dilaurate. Then, 570.8 g of hydroxyethyl acrylate was added and the mixture was stirred for a further one hour at 50-60° C. The reaction was terminated when the residual isocyanate content was 0.1 wt % or less. The resulting urethane acrylate is referred to as "UA-3".

Examples 1-9 and Comparative Experiments 1-3

A reaction vessel equipped with a stirrer was charged with compounds according to the composition (parts by weight) shown in Tables 1 and 2. The mixture was stirred at 50° C. to obtain the compositions.

Test Methods (1) Curing Speed: The liquid compositions were applied to a quartz glass plate using an applicator for a thickness of 200 μm. The applied compositions were irradiated with ultraviolet rays in air using a 3.5 kW metal halide lamp at a dose of 0.1 J/cm$^2$ and 1.0 J/cm$^2$ to obtain cured films. The cured films were allowed to stand at a temperature of 23° C. and a relative humidity of 50% for 24 hours and cut into a 1 cm width to obtain test specimens. The Young's modulus (MPa) of the test specimens was measured using a tensile tester. The measured Young's modulus (MPa) was divided by the UV irradiation dose (J/cm$^2$) to obtain the curing speed.

(2) Viscosity: The viscosity was measured using a B-type viscometer after allowing the composition to stand in a tropical aquarium for 30 minutes at 25° C.

(3) Yellowing Index: The compositions were applied to a clean glass plate using an applicator for a thickness of 200 μm. The applied compositions were irradiated with ultraviolet rays in nitrogen atmosphere using a 3.5 kW metal halide lamp at a dose of 0.1 J/cm$^2$ to obtain cured films. The cured films were allowed to stand at a temperature of 23° C. and a relative humidity of 50% for 24 hours, followed by measuring $\Delta Y.I.$ using a color difference meter.

(4) Surface Properties: Films formed to a thickness of 70 μm were irradiated with ultraviolet rays in air using a 3.5 kW metal halide lamp at a dose of 0.1 J/cm$^2$ to obtain cured films for measuring the stickiness. The cured films were attached one another and allowed to stand under a predetermined load for 24 hours, followed by measuring the stickiness by the 180° peel method using an Instron digital tester (manufactured by Instron Japan, Inc.). Films formed to a thickness of 200 μm were irradiated with ultraviolet rays in air using a 3.5 kW metal halide lamp at a dose of 0.1 J/cm$^2$ to obtain cured films for measuring the dynamic friction coefficient. The films were divided into two and made into cylinders. The cylinders were caused to slide at a load of 100 g to measure the coefficient of resistance using a surface property measurement machine (manufactured by Shinto Scientific Co., Ltd.) to determine the dynamic friction coefficient.

(5) Young's Modulus: The composition was applied to a glass plate using an applicator for a thickness of 250 μm. The applied composition was cured by applying ultraviolet rays in air at a dose of 1 J/cm$^2$ using a 3.5 kW metal halide lamp to obtain a film. The film was cut into a strip-shaped specimen with a width of 6 mm and a length of 25 mm (portion to be tensed). The specimen was subjected to a tensile test at a temperature of 23° C. and a humidity of 50%. The Young's modulus was calculated from the tensile strength at a tensile rate of 1 mm/min and a strain of 2.5%.

The compositions prepared in Examples were evaluated for the above items. The results are shown in Tables 1 and 2.

TABLE 1

|  | Example 1 | Example 2 | Example 3 | Example 4 | Comparative experiment 1 | Comparative experiment 2 | Comparative experiment 3 |
|---|---|---|---|---|---|---|---|
| UA-1 | 55 | 55 | 55 | 70 | 55 | 55 | 70 |
| UA-2 | 15 | 15 | 15 |  | 15 | 15 |  |
| UA-3 | 10 | 10 | 10 |  | 10 | 10 |  |
| Lauryl acrylate | 10 | 10 | 10 | 10 | 10 | 20 | 10 |
| N-Vinylcaprolactam |  |  |  |  | 10 |  | 20 |
| 2-Vinyloxyethyl acrylate | 10 |  |  |  |  |  |  |
| Isobornyl acrylate |  |  |  |  |  |  |  |
| 2-(2'-Vinyloxyethoxy)ethyl acrylate |  | 10 |  | 20 |  |  |  |
| 2-(2'-Vinyloxyethoxy)ethyl methacrylate |  |  | 10 |  |  |  |  |
| Irgacure 184 | 3 | 3 | 3 | 3 | 3 | 3 | 3 |
| Viscosity (Pa·s) | 3.8 | 4.3 | 4.4 | 3.3 | 7.4 | 6.1 | 6.0 |
| Young's modulus (MPa) | 810 | 770 | 800 | 85 | 830 | 540 | 100 |
| Curing speed | 0.83 | 0.86 | 0.76 | 0.85 | 0.86 | 0.75 | 0.85 |
| Yellowing index (ΔY.I.) | 1.3 | 1.1 | 1.0 | 1.2 | 2.1 | 0.9 | 2.9 |
| Surface properties |  |  |  |  |  |  |  |
| Stickiness (N/m) | 6.0 | 7.4 | 3.4 | 7.0 | 7.7 | 17 | 8.5 |
| Dynamic friction coefficient | 0.36 | 0.33 | 0.17 | 0.35 | 0.40 | 1.5 | 0.55 |

2-Vinyloxyethyl acrylate: VEA manufactured by Nippon Shokubai Co., Ltd.
2-(2'-Vinyloxyethoxy)ethyl acrylate: VEEA manufactured by Nippon Shokubai Co., Ltd.
2-(2'-Vinyloxyethoxy)ethyl methacrylate: VEEM manufactured by Nippon Shokubai Co., Ltd.
Irgacure 184: 1-hydroxycyclohexyl phenyl ketone manufactured by Ciba Specialty Chemicals Co., Ltd.

TABLE 2

|  | Comparative Experiment 1 | Comparative Experiment 2 | Comparative Experiment 3 | Example 5 | Example 6 | Example 7 | Example 8 | Example 9 |
|---|---|---|---|---|---|---|---|---|
| UA-1 | 55 | 55 | 70 | 55 | 55 | 55 | 70 | 55 |
| UA-2 | 15 | 15 |  | 15 | 15 | 15 |  | 15 |
| UA-3 | 10 | 10 |  | 10 | 10 | 10 |  | 10 |
| Lauryl acrylate | 10 | 20 | 10 | 10 | 10 | 10 | 10 | 10 |
| N-Vinylcaprolactam | 10 |  | 20 |  |  |  |  |  |
| 2-Hydroxyethyl acrylate |  |  |  | 10 |  |  |  | 20 |
| 2-Hydroxypropyl acrylate |  |  |  |  | 10 |  | 20 |  |
| 4-Hydroxybutyl acrylate |  |  |  |  |  | 10 |  |  |
| Irgacure 184 | 3 | 3 | 3 | 3 | 3 | 3 | 3 | 3 |
| Viscosity (Pa·s) | 7.4 | 6.1 | 6.0 | 3.8 | 4.3 | 4.4 | 3.5 | 2.8 |
| Young's modulus (MPa) | 830 | 540 | 100 | 810 | 770 | 750 | 830 | 690 |
| Curing speed | 0.86 | 0.75 | 0.85 | 0.85 | 0.88 | 0.89 | 0.88 | 0.89 |
| Degree of yellowing of cured product (ΔY.I.) | 2.5 | 0.9 | 2.9 | 0.8 | 0.8 | 0.9 | 0.9 | 0.8 |
| Surface properties |  |  |  |  |  |  |  |  |
| Stickiness (N/m) | 8 | 17 | 9 | 6 | 5 | 3 | 7 | 4 |
| Dynamic friction coefficient | 0.4 | 1.5 | 0.6 | 0.4 | 0.3 | 0.2 | 0.4 | 0.3 |

It can be seen from Tables 1 and 2 that the resin compositions containing 20-90 wt % of the component (A) and 1-35 wt % of the component (B) have low viscosity providing excellent usability and exhibit Young's modulus of 50-1200 MPa when cured. The compositions show a high curing speed, a low yellowing index, and excellent surface properties.

The invention claimed is:

1. A radiation-curable liquid resin composition comprising:

(A) 20-90 wt % of a urethane(meth)acrylate oligomer component comprised of at least first and second different urethane(meth)acrylate oligomers, wherein the first urethane(meth)acrylate oligomer is present in an amount of 10-80 wt. % and is the reaction product of a polyisocyanate compound (b) and a hydroxy-functional ethylenically unsaturated monomer (c), and (B) 1-35 wt % of a monomer component according to the following formula (1),

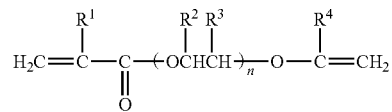

(1)

wherein $R^1$ represents a hydrogen atom or a methyl group, $R^2$ and $R^3$ individually represent a hydrogen atom or an alkyl group having 1-4 carbon atoms, $R^4$ represents a hydrogen atom or a methyl group, and n represents an integer of 1-6.

2. The radiation-curable liquid resin composition according to claim 1, comprising 65-90 wt % of the urethane(meth)acrylate oligomer component (A).

3. The radiation-curable liquid resin composition according to claim 1, wherein the second urethane(meth)acrylate oligomer of the urethane(meth)acrylate oligomer component (A) is the reaction product of a polyol compound (a), a polyisocyanate compound (b1), and a hydroxy-functional ethylenically unsaturated monomer (c1).

4. The radiation-curable liquid resin composition according to claim 1 wherein the urethane(meth)acrylate oligomer component (A) comprises 10-50 wt % of the first urethane(meth)acrylate oligomer.

5. The radiation-curable liquid resin composition according to claim 4, wherein the second urethane(meth)acrylate oligomer is the reaction product of a polyol compound (a), a polyisocyanate (b1), and a hydroxy-functional ethylenically unsaturated monomer (c1).

6. The radiation-curable liquid resin composition according to claim 1, wherein the first urethane(meth)acrylate oligomer is the reaction product of 2-hydroxyethyl(meth)acrylate and 2,4-tolylene diisocyanate.

7. The radiation-curable liquid resin composition according to claim 1, wherein the monomer (B) is at least one compound selected from the group consisting of 2-(2'-vinyloxyethoxy)ethyl(meth)acrylate and 2-vinyloxyethyl(meth)acrylate.

8. The radiation-curable liquid resin composition according to claim 1, further comprising a reactive diluent (C) which is different than the monomer component (B).

9. The radiation-curable liquid resin composition according to claim 8 comprising 1-33 wt % of reactive diluent (C).

10. The radiation-curable liquid resin composition according to claim 1, wherein the composition has a viscosity of 1.0-6.0 Pa·s at 25° C.

11. A coated optical fiber comprising a glass optical fiber and at least one coating surrounding the glass optical fiber, wherein the at least one coating is a cured product of the a radiation-curable composition according to claim 1.

12. Coated and optionally inked optical fiber comprising a glass optical fiber having a primary coating, a secondary coating, and optionally an ink composition applied thereon, wherein at least one of the primary coating, the secondary coating and the ink composition is a cured product of the radiation-curable composition according to claim 1.

13. An optical fiber ribbon comprising a plurality of coated and optionally inked optical fibers according to claim 12, and a matrix material for holding the plurality of optical fibers together.

14. A coated optical fiber according to claim 11, wherein the at least one coating is selected from the group consisting of a primary coating, a secondary coating, and an upjacketing coating.

15. An optical fiber ribbon comprising a plurality of coated and optionally inked optical fibers held together by a matrix material, wherein the matrix material is a cured product of the radiation-curable resin composition according to claim 1.

16. A coated and inked optical fiber comprising a glass optical fiber, at least one coating surrounding the glass optical fiber and an ink composition applied to the at least one coating, wherein the ink composition is a cured product of the radiation-curable resin composition according to claim 1.

* * * * *